(12) United States Patent
Cody et al.

(10) Patent No.: US 12,536,523 B2
(45) Date of Patent: *Jan. 27, 2026

(54) ACCOUNT REGISTRATION USING A CONTACTLESS CARD

(71) Applicant: Capital One Services, LLC, McLean, VA (US)

(72) Inventors: Lea Cody, Arlington, VA (US); Wayne Lutz, Fort Washington, MD (US); Kaitlin Newman, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 287 days.

This patent is subject to a terminal disclaimer.

(21) Appl. No.: 17/522,207

(22) Filed: Nov. 9, 2021

(65) Prior Publication Data

US 2022/0067701 A1 Mar. 3, 2022

Related U.S. Application Data

(63) Continuation of application No. 16/726,366, filed on Dec. 24, 2019, now Pat. No. 11,200,563.

(51) Int. Cl.
*G06Q 20/34* (2012.01)
*G06Q 20/36* (2012.01)
*G06Q 20/38* (2012.01)

(52) U.S. Cl.
CPC ......... *G06Q 20/354* (2013.01); *G06Q 20/352* (2013.01); *G06Q 20/363* (2013.01); *G06Q 20/382* (2013.01)

(58) Field of Classification Search
CPC .... G06Q 30/0623; G06Q 10/00; G06Q 30/00; G06K 7/10722; G06K 7/1417

(Continued)

(56) References Cited

U.S. PATENT DOCUMENTS 5,590,038 A 12/1996 Pitroda
5,666,415 A 9/1997 Kaufman
(Continued)

FOREIGN PATENT DOCUMENTS

CN 101192295 A 6/2008
CN 106779711 A 5/2017
(Continued)

OTHER PUBLICATIONS

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

(Continued)

*Primary Examiner* — Thien M Le
*Assistant Examiner* — Tae W Kim
(74) *Attorney, Agent, or Firm* — KDW FIRM PLLC

(57) ABSTRACT

Account registration using a contactless card. A payment application executing on a device may receive a request to generate a payment account using a contactless card. The payment application may receive encrypted data from the contactless card and transmit the encrypted data to a server associated with the contactless card. The device may receive a push notification from the server and open an account application associated with the contactless card responsive to selection of the push notification. The account application may receive confirmation to generate the payment account using the contactless card and transmit the confirmation to the server. The device may open the payment application responsive to receiving verification of the encrypted data from the server. The payment application may fill form fields with account data received from the server and generate the (Continued)

payment account using the account data received from the server filled into the form fields.

20 Claims, 14 Drawing Sheets

(58) Field of Classification Search
USPC .......................................................... 235/380
See application file for complete search history.

(56) References Cited

U.S. PATENT DOCUMENTS

| | | |
|---|---|---|
| 6,199,114 B1 | 3/2001 | White |
| 6,324,271 B1 | 11/2001 | Sawyer |
| 6,367,011 B1 | 4/2002 | Lee |
| 6,572,015 B1 | 6/2003 | Norton |
| 7,252,242 B2 | 8/2007 | Ho |
| 7,270,276 B2 | 9/2007 | Vayssiere |
| 7,287,692 B1 | 10/2007 | Patel |
| 7,374,099 B2 | 5/2008 | de Jong |
| 7,527,208 B2 | 5/2009 | Hammad |
| 7,568,631 B2 | 8/2009 | Gibbs |
| 7,584,153 B2 | 9/2009 | Brown |
| 7,628,322 B2 | 12/2009 | Holtmanns |
| 7,793,851 B2 | 9/2010 | Mullen |
| 7,801,799 B1 | 9/2010 | Brake, Jr. |
| 7,908,216 B1 | 3/2011 | Davis |
| 7,922,082 B2 | 4/2011 | Muscato |
| 8,010,405 B1 | 8/2011 | Bortolin |
| 8,074,877 B2 | 12/2011 | Mullen |
| 8,082,450 B2 | 12/2011 | Frey |
| 8,108,687 B2 | 1/2012 | Ellis |
| 8,186,602 B2 | 5/2012 | Itay |
| 8,196,131 B1 | 6/2012 | Von Behren |
| 8,249,654 B1 | 8/2012 | Zhu |
| 8,276,814 B1 | 10/2012 | Davis |
| 8,332,272 B2 | 12/2012 | Fisher |
| 8,346,670 B2 | 1/2013 | Hasson |
| 8,511,547 B2 | 8/2013 | Rans |
| 8,519,822 B2 | 8/2013 | Riegebauer |
| 8,750,514 B2 | 6/2014 | Gallo |
| 8,870,081 B2 | 10/2014 | Olson |
| 9,038,893 B2 | 5/2015 | Kirkham |
| 9,129,199 B2 | 9/2015 | Spodak |
| 9,183,490 B2 | 11/2015 | Moreton |
| 9,275,325 B2 | 3/2016 | Newcombe |
| 9,286,606 B2 | 3/2016 | Diamond |
| 9,306,753 B1 | 4/2016 | Vandervort |
| 9,501,776 B2 | 11/2016 | Martin |
| 9,710,744 B2 | 7/2017 | Wurmfeld |
| 9,949,065 B1 | 4/2018 | Zarakas |
| 9,965,632 B2 | 5/2018 | Zarakas |
| 9,965,911 B2 | 5/2018 | Wishne |
| 9,977,890 B2 | 5/2018 | Alberti |
| 9,978,056 B2 | 5/2018 | Seo |
| 9,978,058 B2 | 5/2018 | Wurmfeld |
| 9,990,795 B2 | 6/2018 | Wurmfeld |
| 10,007,873 B2 | 6/2018 | Heo |
| 10,013,693 B2 | 7/2018 | Wyatt |
| 10,121,130 B2 | 11/2018 | Pinski |
| 10,210,505 B2 | 2/2019 | Zarakas |
| 10,242,368 B1 | 3/2019 | Poole |
| 10,296,910 B1 | 5/2019 | Templeton |
| 10,332,102 B2 | 6/2019 | Zarakas |
| 10,360,557 B2 | 7/2019 | Locke |
| 10,380,471 B2 | 8/2019 | Locke |
| 10,395,244 B1 | 8/2019 | Mossler |
| 10,438,437 B1* | 10/2019 | Herrington ............. H04W 4/80 |
| 10,453,054 B2 | 10/2019 | Zarakas |
| 10,474,941 B2 | 11/2019 | Wurmfeld |
| 10,475,027 B2 | 11/2019 | Guise |
| 10,482,453 B2 | 11/2019 | Zarakas |
| 10,482,457 B2 | 11/2019 | Poole |
| 10,489,774 B2 | 11/2019 | Zarakas |
| 10,489,781 B1 | 11/2019 | Osborn |
| 10,510,070 B2 | 12/2019 | Wurmfeld |
| 10,515,361 B2 | 12/2019 | Zarakas |
| 10,535,068 B2 | 1/2020 | Locke |
| 10,546,444 B2 | 1/2020 | Osborn |
| 10,581,611 B1 | 3/2020 | Osborn |
| 10,664,830 B1 | 5/2020 | Rule |
| 10,685,349 B2 | 6/2020 | Brickell |
| 10,797,882 B2 | 10/2020 | Rule |
| 10,880,741 B2 | 12/2020 | Zarakas |
| 10,909,525 B1 | 2/2021 | Dhodapkar |
| 10,970,691 B2 | 4/2021 | Koeppel |
| 10,984,416 B2 | 4/2021 | Ilincic |
| 11,037,136 B2 | 6/2021 | Rule |
| 11,062,098 B1 | 7/2021 | Bergeron |
| 11,120,453 B2 | 9/2021 | Rule |
| 11,138,593 B1 | 10/2021 | Ho |
| 11,138,605 B2 | 10/2021 | Aabye |
| 11,176,540 B2 | 11/2021 | Gupta |
| 11,188,908 B2 | 11/2021 | Locke |
| 11,216,806 B2 | 1/2022 | Mossler |
| 11,297,958 B2 | 4/2022 | Vukich |
| 11,334,872 B2 | 5/2022 | Phillips |
| 11,361,173 B2 | 6/2022 | Edwards |
| 11,392,933 B2 | 7/2022 | Mossler |
| 11,392,935 B2 | 7/2022 | Suresh |
| 11,416,844 B1 | 8/2022 | Osterkamp |
| 11,423,392 B1 | 8/2022 | Ho |
| 11,443,292 B2 | 9/2022 | Sherif |
| 11,444,770 B2 | 9/2022 | Wieker |
| 11,461,764 B2 | 10/2022 | Rule |
| 11,481,764 B2 | 10/2022 | Shakkarwar |
| 11,521,213 B2 | 12/2022 | Rule |
| 11,551,200 B1 | 1/2023 | Cook |
| 11,556,918 B2 | 1/2023 | Mestre |
| 11,615,395 B2 | 3/2023 | McHugh |
| 11,777,933 B2 | 10/2023 | Moreton |
| 2003/0220876 A1 | 11/2003 | Burger |
| 2005/0156026 A1 | 7/2005 | Ghosh |
| 2005/0228997 A1 | 10/2005 | Bicker |
| 2005/0269402 A1 | 12/2005 | Spitzer |
| 2007/0276765 A1 | 11/2007 | Hazel |
| 2008/0082452 A1 | 4/2008 | Wankmueller |
| 2008/0099552 A1 | 5/2008 | Grillion |
| 2009/0143104 A1 | 6/2009 | Loh |
| 2009/0144197 A1 | 6/2009 | Hurry |
| 2009/0235339 A1 | 9/2009 | Mennes |
| 2009/0282264 A1 | 11/2009 | Amiel |
| 2011/0113245 A1 | 5/2011 | Varadarajan |
| 2011/0155801 A1 | 6/2011 | Rowberry |
| 2012/0136786 A1* | 5/2012 | Romagnoli ........... G06Q 20/354 |
| | | 705/44 |
| 2012/0143703 A1 | 6/2012 | Wall |
| 2013/0030997 A1 | 1/2013 | Spodak |
| 2013/0146657 A1 | 6/2013 | Graef |
| 2013/0211937 A1 | 8/2013 | Elbirt |
| 2013/0311363 A1 | 11/2013 | Ramaci |
| 2014/0074637 A1 | 3/2014 | Hammad |
| 2014/0074655 A1 | 3/2014 | Lim |
| 2014/0081785 A1 | 3/2014 | Valadas Preto |
| 2014/0365377 A1 | 12/2014 | Salama |
| 2015/0032635 A1 | 1/2015 | Guise |
| 2015/0073983 A1 | 3/2015 | Bartenstein |
| 2015/0113271 A1 | 4/2015 | Jooste |
| 2015/0134513 A1 | 5/2015 | Olson |
| 2015/0199673 A1 | 7/2015 | Savolainen |
| 2015/0199863 A1 | 7/2015 | Scoggins |
| 2015/0254637 A1 | 9/2015 | Yang |
| 2015/0317295 A1 | 11/2015 | Sherry |
| 2016/0078430 A1 | 3/2016 | Douglas |
| 2016/0189143 A1 | 6/2016 | Koeppel |
| 2016/0253651 A1 | 9/2016 | Park |
| 2016/0277383 A1 | 9/2016 | Guyomarc'h |
| 2016/0307189 A1 | 10/2016 | Zarakas |
| 2016/0314472 A1 | 10/2016 | Ashfield |
| 2016/0379187 A1* | 12/2016 | Wijngaarden ........ G06Q 20/204 |
| | | 705/40 |
| 2016/0379217 A1 | 12/2016 | Hammad |
| 2017/0017957 A1 | 1/2017 | Radu |
| 2017/0039566 A1 | 2/2017 | Schipperheijn |

(56) References Cited

U.S. PATENT DOCUMENTS

| | | | |
|---|---|---|---|
| 2017/0068950 A1 | 3/2017 | Kwon | |
| 2017/0076265 A1* | 3/2017 | Royyuru | G06Q 20/18 |
| 2017/0330173 A1 | 11/2017 | Woo | |
| 2018/0039987 A1 | 2/2018 | Molino | |
| 2018/0174121 A1* | 6/2018 | Denton | G06Q 20/12 |
| 2018/0211249 A1 | 7/2018 | Sims et al. | |
| 2018/0268132 A1 | 9/2018 | Buer | |
| 2018/0300716 A1 | 10/2018 | Carlson | |
| 2019/0172055 A1 | 6/2019 | Hale | |
| 2019/0303945 A1 | 10/2019 | Mitra | |
| 2021/0004806 A1 | 1/2021 | Noe | |
| 2021/0272098 A1 | 9/2021 | Delsuc | |
| 2021/0304189 A1 | 9/2021 | Gupta | |
| 2021/0383360 A1 | 12/2021 | Sinha | |
| 2021/0406869 A1 | 12/2021 | Pathrabe | |
| 2022/0114581 A1 | 4/2022 | Upadhye | |
| 2022/0284416 A1 | 9/2022 | Rule | |
| 2022/0309509 A1 | 9/2022 | Akgun | |
| 2022/0335412 A1 | 10/2022 | Rule | |
| 2022/0366410 A1 | 11/2022 | Rule | |
| 2022/0398566 A1 | 12/2022 | Rule | |
| 2022/0414648 A1 | 12/2022 | Rule | |
| 2023/0054157 A1 | 2/2023 | Mao | |
| 2023/0065163 A1 | 3/2023 | Vargas | |
| 2023/0083785 A1 | 3/2023 | Maiman | |
| 2023/0169505 A1 | 6/2023 | Rule | |
| 2023/0354020 A1 | 11/2023 | Rule | |
| 2023/0359839 A1 | 11/2023 | Lovgren | |

FOREIGN PATENT DOCUMENTS

| | | |
|---|---|---|
| GB | 2516861 A | 2/2015 |
| GB | 2551907 A | 1/2018 |
| JP | 2008541303 A | 11/2008 |
| KR | 20150140132 A | 12/2015 |
| WO | 9910824 A1 | 3/1999 |
| WO | 0049586 A1 | 8/2000 |
| WO | 2013155562 A1 | 10/2013 |
| WO | 2015183818 A1 | 12/2015 |
| WO | 2017047855 A1 | 3/2017 |
| WO | 2019022585 A1 | 1/2019 |
| WO | 2019108304 A1 | 6/2019 |
| WO | 2021051884 A1 | 3/2021 |
| WO | 2021133492 A1 | 7/2021 |
| WO | 2022108959 A1 | 5/2022 |
| WO | 2022187350 A1 | 9/2022 |
| WO | 2023017943 A1 | 2/2023 |
| WO | 2023064063 A1 | 4/2023 |

OTHER PUBLICATIONS

Author Unknown, "Global expansion of card tapping mobile OTP for security and convenience is imminent," Jun. 28, 2022, website: https://www.swidch.com/blogs/card-tapping-motp-blog.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author unknown, "EMV Card Personalization Specification", EMVCo., LLC., specification version 1.0, (2003) 81 pages.

Author Unknown, "EMV Contactless Specifications for Payment Systems", EMV Book B - Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Batina et al., "SmartCards and RFID", PowerPoint Presentation for IPA Security Course, Digital Security at University of Nijmegen, Netherlands. Retrieved from Internet URL: https://www.cs.ru.nl/E.Poll/teaching/ipa_smartcards.pdf, available on at least Jun. 2, 2019 per Internet Archives, https://web.archive.org/, 75 pages.

Emvco: "EMV Card Personalisation Specification", Aug. 1, 2021, pp. 1-114, Retrieved from the Internet: URL: https://www.emvco.com/specification/?post_id=12467.

Faraj, S.T., et al., "Investigation of Java Smart Card Technology for Multi-Task Applications", J of Al-Anbar University for Pure Science, 2(1):23 pages (2008).

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Pourghomi, P., et al., "A Proposed NFC Payment Application," International Journal of Advanced Computer Science and Applications, 4(8):173-181 (2013).

Saush, "Getting information from an EMV chip card with Java," Sep. 8, 2006, WordPress, pp. 1-13.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Smart Card Alliance, "Co-Branded Multi-Application Contactless Cards for Transit and Financial Payment," A Smart Card Alliance Transportation Council White Paper (40 pages), Mar. 2008.

Ullmann et al., "On-Card"User Authentication for Contactless Smart Cards based on Gesture Recognition, paper presentation LNI proceedings, (2012) 12 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

* cited by examiner

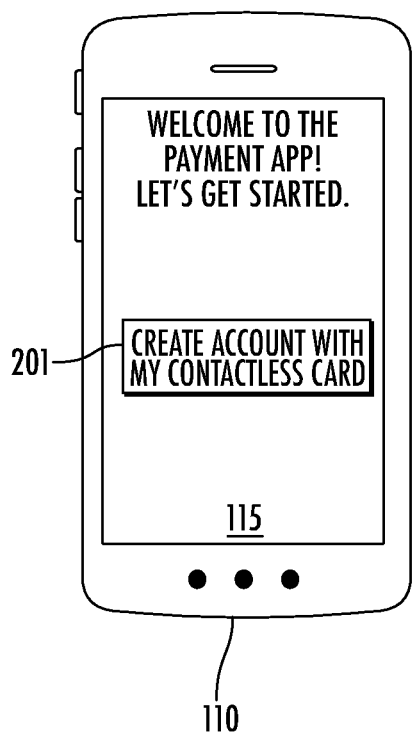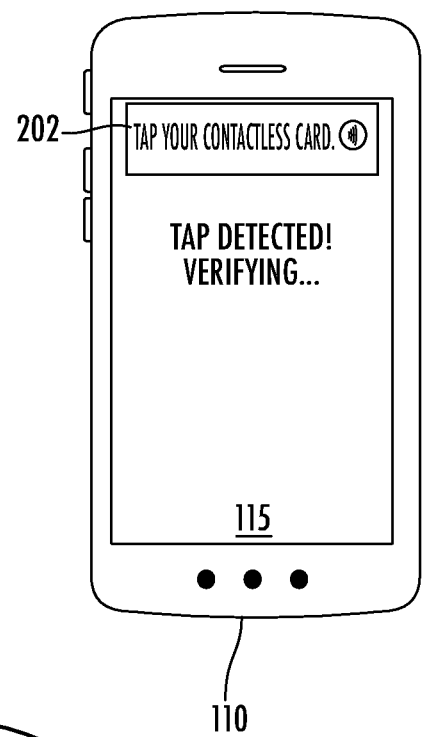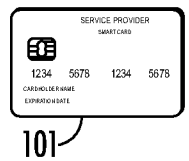
FIG. 2A    FIG. 2B

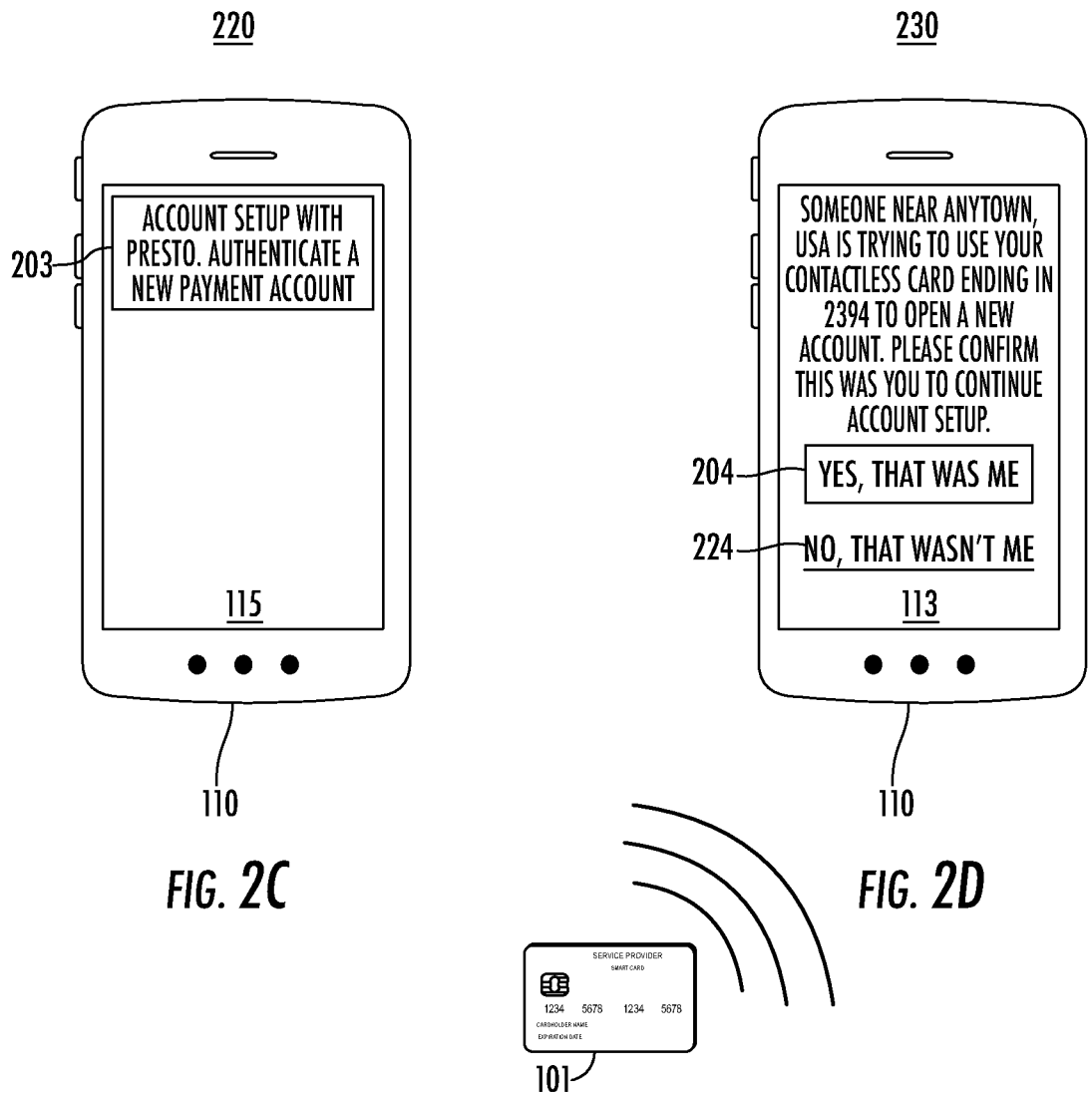

ACCOUNT REGISTRATION USING A CONTACTLESS CARD

RELATED APPLICATIONS

This application is a continuation of U.S. patent application Ser. No. 16/726,366, titled "ACCOUNT REGISTRATION USING A CONTACTLESS CARD" filed on Dec. 24, 2019. The contents of the aforementioned application are incorporated herein by reference in their entirety.

TECHNICAL FIELD

Embodiments herein generally relate to computing platforms, and more specifically, to using a contactless card to register an account.

BACKGROUND

Third-party payment services allow users to make payments using different payment accounts. However, registering for an account with a third-party payment service using a payment account can expose security risks. For example, malicious users may attempt to generate a fraudulent account with the third-party payment service using compromised information of a user and/or the user's payment account. As such, the third-party payment service and/or an institution associated with the payment account may be unable to distinguish between legitimate and fraudulent attempts to generate the third-party payment accounts.

SUMMARY

Embodiments disclosed herein provide systems, methods, articles of manufacture, and computer-readable media for tapping to autofill card data to a form on a computing device. According to one example, a payment application executing on a device may receive an indication specifying to generate a payment account with the payment application using a contactless card. The payment application may output an indication specifying to tap the contactless card to the device. The device may receive encrypted data from a communications interface of the contactless card, the encrypted data based on a customer identifier and a private key associated with the contactless card. The device may transmit the encrypted data to a server associated with the contactless card and receive a push notification from the server. The device may open an account application associated with the contactless card responsive to receiving selection of the push notification. The account application may receive confirmation input specifying to generate the payment account with the payment application using the contactless card. The account application may transmit an indication of the confirmation input to the server. The device may open the payment application responsive to the payment application receiving a verification of the encrypted data from the server. The payment application may fill a plurality of form fields of a form displayed in the payment application with account data received from the server, the account data of an account associated with the contactless card. The payment application may generate the payment account using the account data received from the server and filled into the plurality of form fields.

BRIEF DESCRIPTION OF THE DRAWINGS

FIGS. 2A-2G illustrate embodiments of account generation using a contactless card.

DETAILED DESCRIPTION

Figure 1A:
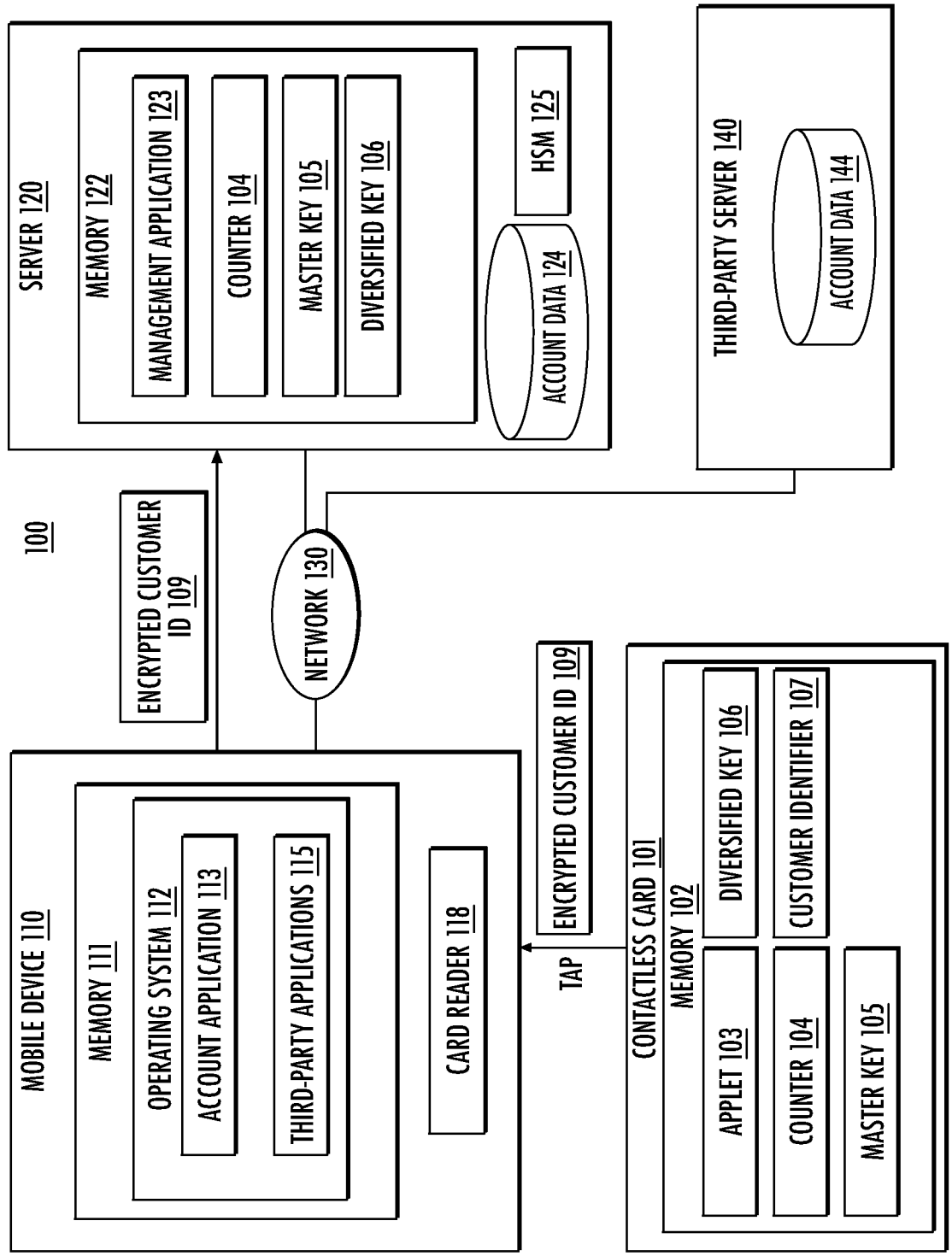
FIGS. 1A-1E illustrate embodiments of a system for account generation using a contactless card.

Embodiments disclosed herein provide secure techniques to generate an account using a contactless card. The account may be a third-party payment account for a third-party payment service that provides a third-party payment application for use on computing devices. A payment account associated with a contactless card provided by a financial institution may be used to fund transactions using the third-party payment account. When attempting to register an account with the third-party payment application, the user may select an option to securely generate the account using the contactless card. In response, the third-party payment application may output an indication to tap the contactless card to the device. The user may then tap the contactless card to the device. The device may then instruct the contactless card to generate and transmit encrypted data to the device. The data generated by the contactless card may be encrypted using key diversification. The device may transmit the encrypted data received from the contactless card to a first server associated with the financial institution providing the contactless card.

The first server may verify the encrypted data received from the contactless card by decrypting the encrypted data. The first server may then transmit a push notification to the device. The device may output the push notification for display on a display. An account application provided by the financial institution may be opened on the device responsive to a user selecting the notification. The account application may then require the user to provide authentication credentials to access an account associated with the contactless card. The account application may then ask the user to confirm whether the attempted account generation using the third-party payment application is valid. If the user provides input specifying the account generation is not valid, the third-party account generation may be restricted to preserve security of the account associated with the contactless card. Otherwise, the account application may transmit an indication to the first server indicating the user confirmed the validity of the attempted account generation using the third-party payment application.

The device may output the third-party payment application for display. The third-party payment application may receive, from the first server, account data for the account associated with the contactless card. The account data may comprise one or more of a first name, a last name, an email address, an address, an account number of the contactless card, an expiration date of the contactless card, and a card verification value (CVV) of the contactless card. The third-party payment application may automatically fill the received account data to corresponding form fields in a form provided by the third-party payment application. Responsive to receiving user input specifying to generate the account, the third-party payment application may generate the account using the data received from the server. A record for the generated account may be stored in a second server associated with the third-party payment application. The user may then make purchases using the third-party payment application and the underlying account associated with the contactless card.

Advantageously, doing so improves security of all devices and associated data. For example, the verification of the encrypted data by the first server provides an additional safeguard to prevent fraudulent activity by confirming that the contactless card is in the possession of the user attempting to create the account. Doing so further confirms that the contactless card is not fraudulent, as a fraudulent card is likely to be unable to generate encrypted data that can be verified by the server. Furthermore, conventional approaches require the user to manually enter the account data into a form. However, doing so may allow other users or devices to capture the card data as the user enters the card data into the form. By eliminating the need for the user to manually enter card data into the form, the security of the account data is enhanced.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1A depicts a schematic of an exemplary system 100, consistent with disclosed embodiments. As shown, the system 100 includes one or more contactless cards 101, one or more mobile devices 110, a server 120, and a third-party server 140. The contactless cards 101 are representative of any type of payment card, such as a credit card, debit card, ATM card, gift card, and the like. The contactless cards 101 may comprise one or more chips (not depicted), such as a radio frequency identification (RFID) chip, configured to communicate with the mobile devices 110 via NFC, the EMV standard, or other short-range protocols in wireless communication. Although NFC is used as an example communications protocol, the disclosure is equally applicable to other types of wireless communications, such as the EMV standard, Bluetooth, and/or Wi-Fi. The mobile devices 110 are representative of any type of network-enabled computing devices, such as smartphones, tablet computers, wearable devices, laptops, portable gaming devices, and the like. The servers 120, 140 are representative of any type of computing device, such as a server, workstation, compute cluster, cloud computing platform, virtualized computing system, and the like.

As shown, a memory 111 of the mobile device 110 includes an instance of an operating system (OS) 112. Example operating systems 112 include the Android® OS, iOS®, Linux®, and Windows® operating systems. As shown, the OS 112 includes an account application 113 and one or more third-party applications 115. The account application 113 allows users to perform various account-related operations, such as viewing account balances, purchasing items, and processing payments. In some embodiments, a user may authenticate using authentication credentials to access the account application 113. For example, the authentication credentials may include a username and password, biometric credentials, and the like.

The third-party applications 115 are representative of any type of payment application that allows registered users to process transactions using payment sources added by the user. For example, a user may register to create an account with a third-party application 115 and add the contactless card 101 as a payment source. Doing so allows the user to make purchases using the third-party application 115 using the contactless card 101 (and/or the account associated with the contactless card 101) as a form of payment. Examples of third-party applications 115 include, but are not limited to, PayPal®, Venmo®, Apple® Pay, Samsung® Pay, Google® Pay, and the like. Advantageously, embodiments disclosed herein provide secure techniques to create an account with a third-party application 115 having the contactless card 101 as a payment source. A third-party server 140 may be associated with a given third-party application 115. The third party server 140 may generally include a database of account data 144 for user accounts. The account data 144 may include user biographical information, address information, payment information, account numbers, account expiration dates, CVVs, login credentials, and any other type of account and/or personal data for a plurality of users.

As shown, a memory 102 of the contactless card 101 includes an applet 103, a counter 104, a master key 105, a diversified key 106, and a unique customer identifier (ID) 107. The customer ID 107 may uniquely identify a user and/or an account of the user with a financial institution providing the contactless card 101. The applet 103 may execute on a processor (not pictured) of the contactless card 101 to perform the various functions described in greater detail herein.

As shown, the server 120 includes a data store of account data 124 and a memory 122. The account data 124 includes account-related data for a plurality of users and/or accounts. The account data 124 may include at least a master key 105, counter 104, a customer ID 107, an associated contactless card 101 (including account number, expiration date, and CVV), account holder name, account billing address, one or more shipping addresses, one or more virtual card numbers, and biographical information for each account. The memory 122 includes a management application 123 and instances of the counter 104, master key 105, and diversified key 106 for one or more accounts from the account data 124.

As stated, the contactless card 101 may be used at least in part to create an account in the account data 144 of the third-party server 140 using a third-party application 115. Generally, a user of the third-party application 115 may specify to use the contactless card 101 to create a new account. Doing so causes the third-party application 115 to output an indication specifying to tap the contactless card 101 to the device 110. Doing so brings the contactless card 101 within communications range of the card reader 118 of the mobile device 110 and causes the applet 103 to generate an encrypted customer ID 109. The applet 103 may use any number of techniques to generate the encrypted customer ID 109 based on a cryptographic algorithm and the customer ID 107.

As stated, the system 100 is configured to implement key diversification to secure data, which may be referred to as a key diversification technique herein. Generally, the server 120 (or another computing device) and the contactless card 101 may be provisioned with the same master key 105 (also referred to as a master symmetric key). More specifically, each contactless card 101 is programmed with a distinct master key 105 that has a corresponding pair in the server 120. For example, when a contactless card 101 is manufactured, a unique master key 105 may be programmed into the memory 102 of the contactless card 101. Similarly, the unique master key 105 may be stored in a record of a customer associated with the contactless card 101 in the account data 124 of the server 120 (and/or stored in a different secure location, such as the hardware security module (HSM) 125. The master key 105 may be kept secret from all parties other than the contactless card 101 and server 120, thereby enhancing security of the system 100. In some embodiments, the applet 103 of the contactless card 101 may encrypt and/or decrypt data (e.g., the customer ID 107) using the master key 105 and the data as input a cryptographic algorithm. For example, encrypting the customer ID 107 with the master key 105 may result in the encrypted customer ID 109. Similarly, the authentication server 120 may encrypt and/or decrypt data associated with the contactless card 101 using the corresponding master key 105.

In other embodiments, the master keys 105 of the contactless card 101 and server 120 may be used in conjunction with the counters 104 to enhance security using key diversification. The counters 104 comprise values that are synchronized between the contactless card 101 and server 120. The counter value 104 may comprise a number that changes each time data is exchanged between the contactless card 101 and the server 120 (and/or the contactless card 101 and the mobile device 110). When preparing to send data (e.g., to the server 120 and/or the mobile device 110), the contactless card 101 may increment the counter value 104. The contactless card 101 may then provide the master key 105 and counter value 104 as input to a cryptographic algorithm, which produces a diversified key 106 as output. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES128; a symmetric HMAC algorithm, such as HMAC-SHA-256; and a symmetric CMAC algorithm such as AES-CMAC. Examples of key diversification techniques are described in greater detail in U.S. patent application Ser. No. 16/205,119, filed Nov. 29, 2018. The aforementioned patent application is incorporated by reference herein in its entirety.

Continuing with the key diversification example, the contactless card 101 may then encrypt the customer ID 107 using the diversified key 106 and the data as input to the cryptographic algorithm. For example, encrypting the customer ID 107 with the diversified key 106 may result in the encrypted customer ID 109.

Regardless of the encryption technique used to encrypt the customer ID 107, the contactless card 101 may transmit the encrypted customer ID 109 to the mobile device 110 (e.g., via an NFC connection, Bluetooth connection, etc.). Once received, the mobile device 110 (e.g., the OS 112 and/or the third-party application 115) may transmit the encrypted customer ID 109 to the server 120 via the network 130. In one embodiment, the encrypted customer ID 109 is transmitted via a hypertext transfer protocol secure (HTTPS) application programming interface (API) call to an API provided by the management application 123.

Once received, the management application 123 may authenticate the encrypted customer ID 109. For example, the management application 123 may attempt to decrypt the encrypted customer ID 109 using a copy of the master key 105 stored in the memory 122 of the authentication server 120. In another example, the management application 123 may provide the master key 105 and counter value 104 as input to the cryptographic algorithm, which produces a diversified key 106 as output. The resulting diversified key 106 may correspond to the diversified key 106 of the contactless card 101, which may be used to decrypt the encrypted customer ID 109.

Regardless of the decryption technique used, the management application 123 may decrypt the encrypted customer ID 109, thereby verifying the encrypted customer ID 109 (e.g., by comparing the resulting customer ID 107 to a customer ID stored in the account data 124, and/or based on an indication that the decryption using the key 105 and/or 106 was successful). Although the keys 105, 106 are depicted as being stored in the memory 122, the keys 105, 106 may be stored elsewhere, such as in a secure element and/or the HSM 125. In such embodiments, the secure element and/or the HSM 125 may decrypt the encrypted customer ID 109 using the keys 105 and/or 106 and a cryptographic function. Similarly, the secure element and/or HSM 125 may generate the diversified key 106 based on the master key 105 and counter value 104 as described above.

If, however, the management application 123 is unable to decrypt the encrypted customer ID 109 to yield the expected result (e.g., the customer ID 107 of the account associated with the contactless card 101), the management application 123 does not validate the encrypted customer ID 109. In such an example, the management application 123 transmits an indication of the failed verification to the third-party application 115. As such, the third-party application 115 may refrain from generating the requested account to preserve the security of the account associated with the contactless card 101. Generally, the management application 123 may condition any operation on whether the encrypted customer ID 109 is successfully decrypted.

Figure 1B:
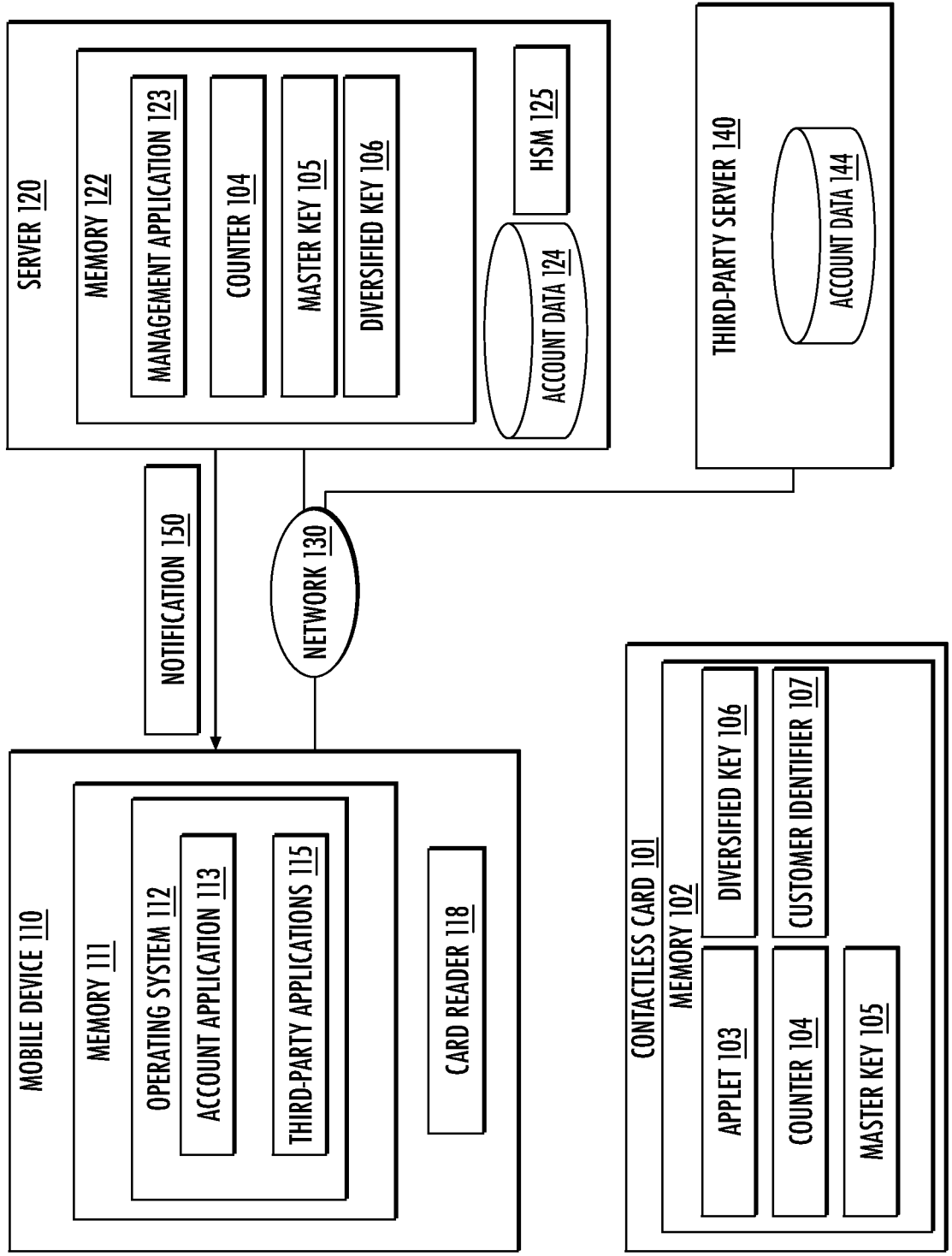

FIG. 1B depicts an embodiment where the management application 123 has verified the encrypted customer ID 109. More specifically, as shown, responsive to verifying (e.g., decrypting) the encrypted customer ID 109, the management application 123 transmits a push notification 150 to the mobile device 110. The notification 150 may generally indicate that the attempted account generation using the third-party application 115 needs to be verified. The OS 112 may output the notification 150 for display on a display of the mobile device 110. The user may tap or otherwise select the notification 150, which causes the account application 113 to be displayed on the mobile device 110. The user may then provide authentication credentials to access the account associated with the contactless card 101. Once authenticated, the account application 113 may request user verification (or confirmation) for the requested account generation. If the user declines to verify the requested account generation, the account generation is restricted to preserve security.

Figure 1C:
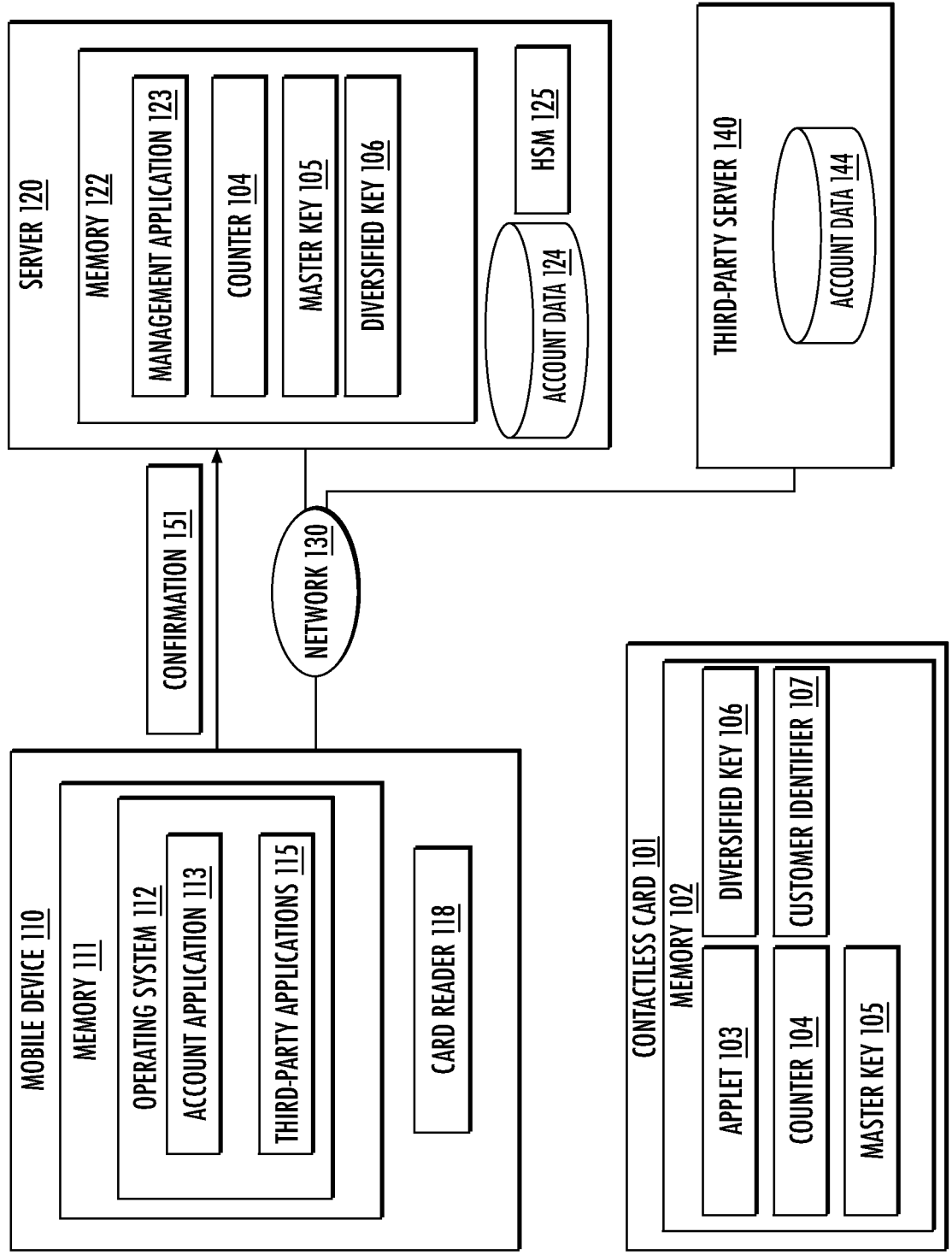

FIG. 1C depicts an embodiment where the user verifies the requested account generation via the account application 113. Once the user verifies the requested account generation, the account application 113 may transmit a confirmation 151 to the server 120. The confirmation 151 may be sent via an HTTPS API call to an API provided by the management application 123.

Figure 1D:
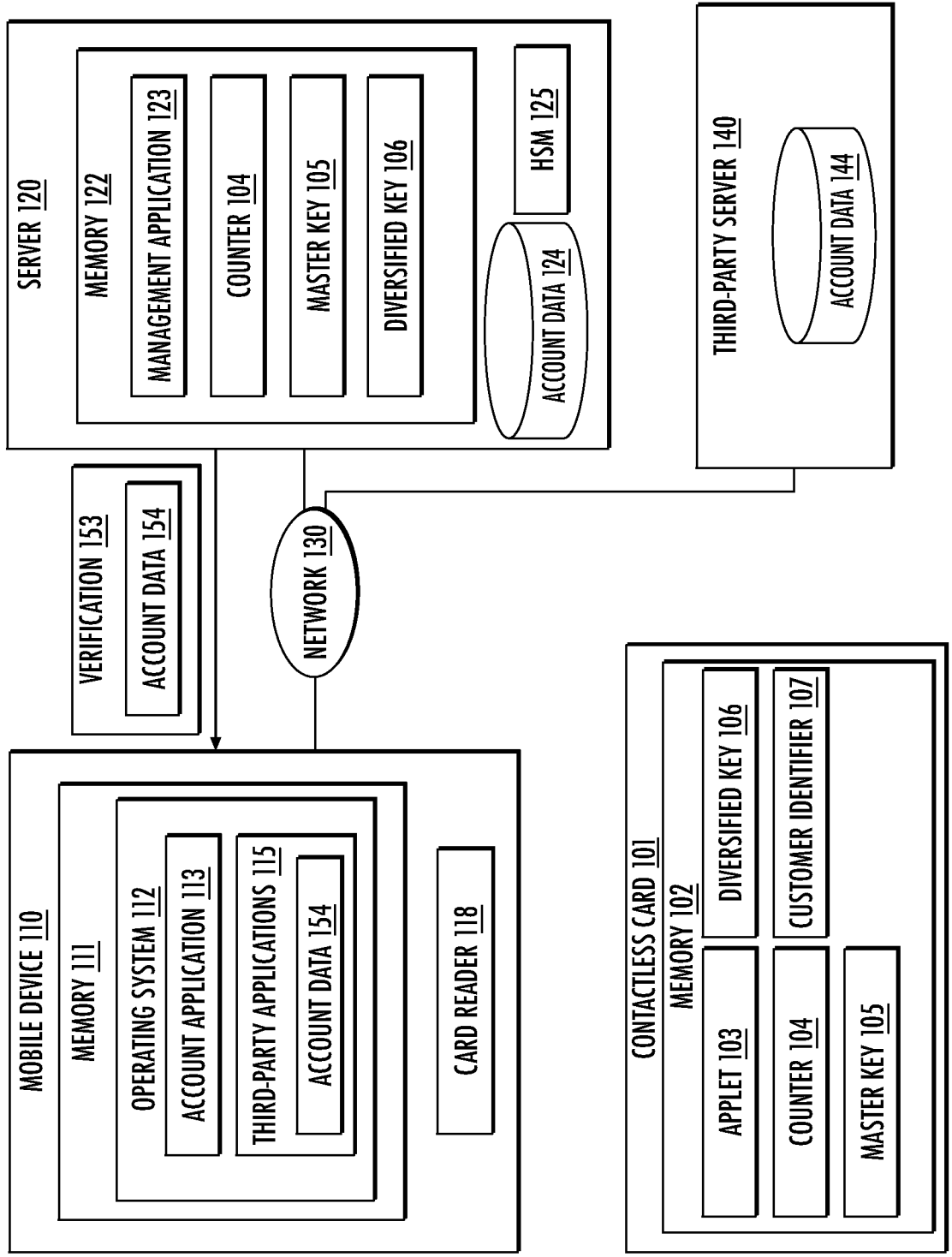

FIG. 1D depicts an embodiment where the management application 123 has received the confirmation 151 from the mobile device 110. As shown, the management application 123 transmits a verification 153 comprising account data 154 to the third-party application 115. The verification 153 may generally instruct the third-party application 115 that the account generation has been securely verified. The management application 123 may generally transmit the verification 153 responsive to receiving the confirmation 151 and based on successful decryption of the encrypted customer ID 109. Although the decryption of the encrypted customer ID 109 was discussed with reference to FIGS. 1A/1B, the management application 123 may attempt to decrypt the encrypted customer ID 109 at any point, such as subsequent to receiving the confirmation 151.

The account data 154 provided by the management application 123 generally includes data describing the user and/or the account associated with the contactless card 101. For example, the account data 154 may include a first name of the user, a last name of the user, an email address of the user, an address of the user, an account number of the contactless card 101, an expiration date of the contactless card 101, and a card verification value (CVV) of the contactless card 101. Embodiments are not limited in this context, as the account data 154 may include fewer or more data attributes. For example, in some embodiments, to preserve security the account data 154 may include a virtual account number rather than an account number of the contactless card 101. In such embodiments, the management application 123 may transmit the virtual account number if the third-party application 115 and/or the third-party server 140 do not tokenize account numbers (e.g., the account number of the contactless card 101). However, if the account numbers are tokenized by the third-party application 115 and/or the third-party server 140, the management application 123 may include the account number of the contactless card 101.

Once received, the third-party application 115 may automatically fill (or populate) the account data 154 into a plurality of form fields of a form outputted by the third-party application 115. For example, the first/last names may be filled into first/last name fields of the form, the email address may be filled into an email address field of the form, portions of the address (e.g., street address, city, state, ZIP code) may be filled to one or more address fields of the form, the account number may be filled into an account number field of the form, the expiration date of the account number may be filled into an expiration date field of the form, and the CVV may be filled into a CVV field of the form. The user may then review and submit the form via the third-party application 115 to complete generation of the account. In some embodiments, the user may modify the data in the form prior to submitting the form. In some embodiments, the third-party application 115 may obfuscate or otherwise refrain from displaying one or more elements of account data, such as account numbers.

Figure 1E:
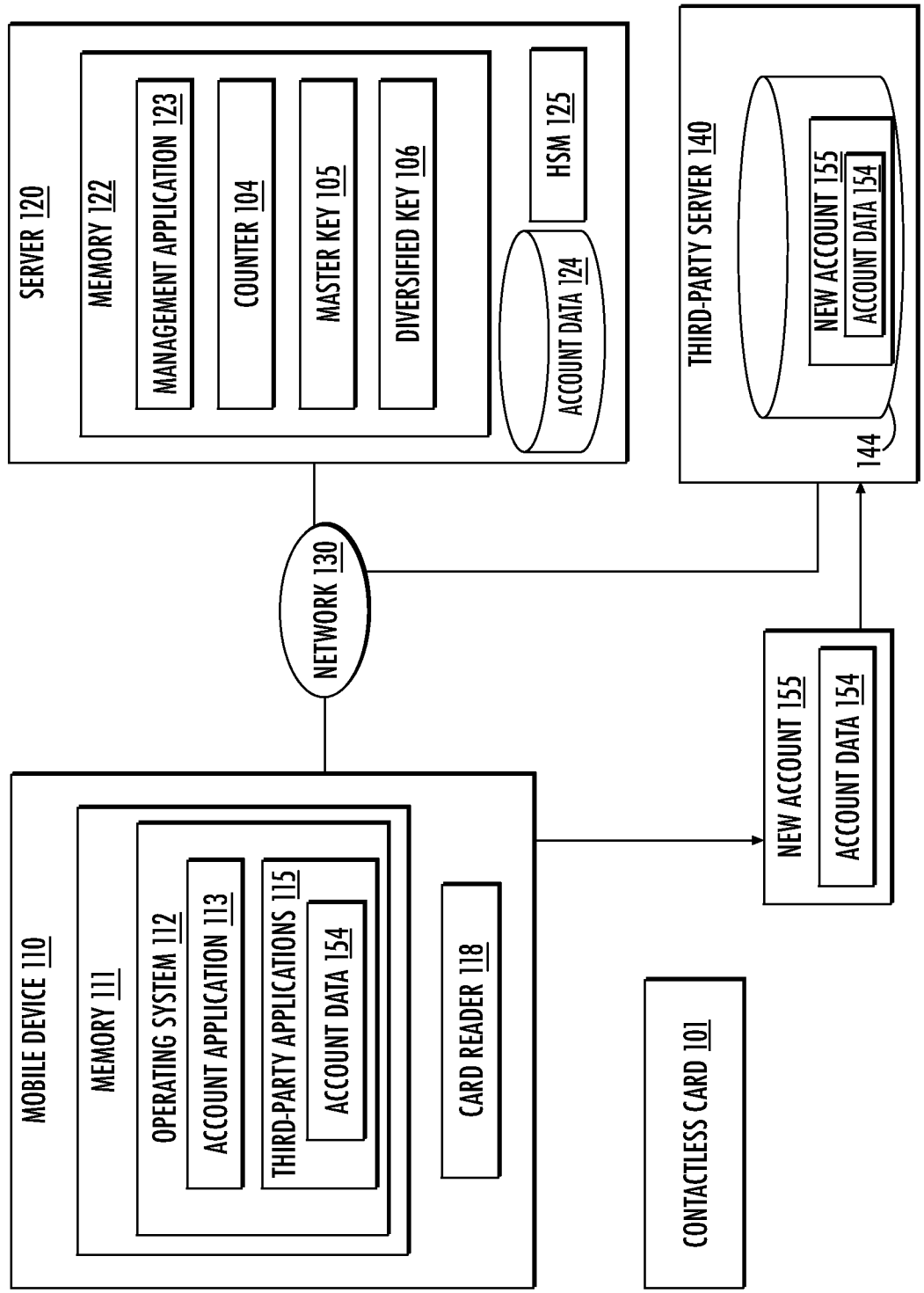

FIG. 1E depicts an embodiment where the user has submitted the form via the third-party application 115. As shown, the third-party application 115 may transmit an indication of a new account 155 including the account data 154 to the third-party server 140. In some embodiments, the new account 155 is created by the third-party application 115. In other embodiments, the third-party application 115 transmits a request to generate the new account 155 to the third-party server 140, and the third-party server 140 generates the new account 155. Regardless of the entity generating the new account 155, one or more records for the new account 155 using the account data 154 may be generated in the account database 144 of the third-party server 140.

The user may then use the new account 155 to make purchases, transfer funds, engage in transactions, and perform any other financial operation using the contactless card 101 (and/or the virtual account number for the contactless card 101) via the third-party application 115. Advantageously, embodiments disclosed herein enhance security by conditioning account generation via the third-party application 115 using the contactless card 101 based at least in part on verification of the encrypted customer ID 109, authenticating account credentials in the account application 113, and the secure communications between the entities of the system 100.

FIG. 2A is a schematic 200 depicting an example embodiment of account generation using a contactless card 101. A graphical user interface (GUI) of the third-party application 115 on the mobile device 110 provide a GUI element 201 that allows a user to generate an account with the third-party application 115 using the contactless card 101. When the user selects GUI 201, the third-party application 115 may output an indication 202 specifying to tap the contactless card 101 to the device 110 as depicted in the schematic 210 of FIG. 2B.

As shown in FIG. 2B, the user may tap the contactless card 101 to the device 110. Once the user taps the contactless card 101 to the mobile device 110, the applet 103 of the contactless card 101 generates the encrypted customer ID 109. The applet 103 may then transmit the encrypted customer ID 109 to the mobile device 110, e.g., via NFC. Once received, the third-party application 115 may transmit the encrypted customer ID 109 to the management application 123, e.g., via an HTTPS API call.

The schematic 220 of FIG. 2C depicts a push notification 203 outputted for display on the mobile device 110. As stated, the management application 123 may generate the push notification 203 responsive to receiving and/or verifying the encrypted customer ID 109. The management application 123 may then transmit the push notification 203 to the mobile device 110. Once the user selects the push notification 203, the account application 113 may be opened on the mobile device 110.

FIG. 2D is a schematic 230 illustrating an embodiment where the user selects the push notification 203. As shown in FIG. 2D, the account application 113 is opened on the mobile device 110. The account application 113 generally informs the user that an attempt to open an account using the third-party application 115 has been detected. The account application 113 may provide GUI element 204 to allow the user to confirm (or verify) that the attempt is valid, e.g., initiated by the user associated with the account. As stated, in some embodiments, the user may be required to provide authentication credentials to the account application 113 before the GUI depicted in FIG. 2D is outputted. If the user wishes to confirm, the user may select GUI element 204. Otherwise, the user may select GUI element 224, which restricts generation of the new account via the third-party application 115. The account application 113 may transmit an indication of the selected GUI element 204, 224 to the management application 123.

Figure 2E:
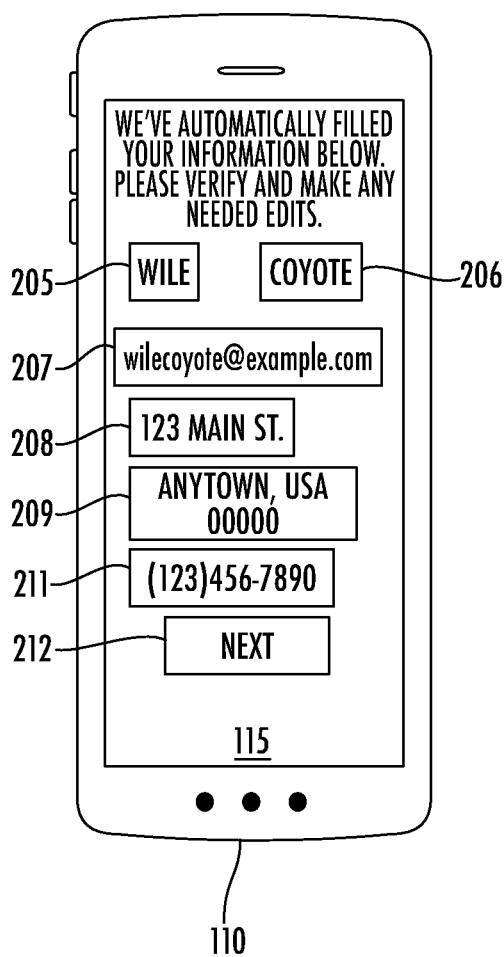

FIG. 2E is a schematic 240 illustrating an embodiment where the user selects GUI element 204 to confirm the validity of the attempted account generation via the third-party application 115. As stated, once the user selects the GUI element 204, the account application 113 may transmit an indication to the management application 123 that the user selected the GUI element 204. Doing so causes the management application 123 to transmit the verification to the third-party application 115 with the account data 154 associated with the contactless card 101. As stated, the account data 154 may include a first name of the user, a last name of the user, an email address of the user, an address of the user, an account number of the contactless card 101, an expiration date of the contactless card 101, and a card verification value (CVV) of the contactless card 101. In some embodiments, a virtual account number, expiration date of the virtual account number, and CVV of the virtual account number may be included in lieu of the account number, expiration date, and CVV of the contactless card 101.

As shown, the third-party application 115 may include form fields 205-209 and 211. The third-party application 115 has automatically filled the form fields 205-209 and 211 with the account data 154 received from the management application 123. For example, as shown, a first name has been filled into first name field 205, a last name has been filled into the last name field 206, an email address has been filled into the email address field 207, a street address has been filled into the street address field 208, and additional address information has been filled into the address information field 209. The particular values depicted in FIG. 2E are exemplary and should not be considered limiting of the disclosure. In some embodiments, the user may optionally make modifications to the values filled into form fields 205-209 and 211. The user may then select the next button 212 to proceed.

Figure 2F:
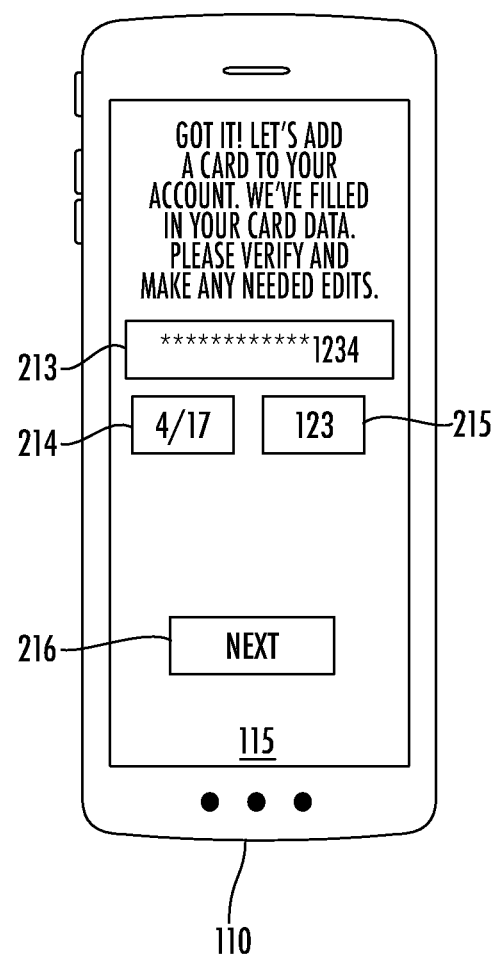

FIG. 2F is a schematic 250 illustrating an embodiment where the user has selected the next button 212 in FIG. 2E. As shown, the third-party application 115 outputs form fields 213-215. The third-party application 115 has filled a card number into the card number field 213, an expiration date into the expiration date field 214, and a CVV into the CVV field 215. Although depicted as being parts of separate forms, in one embodiment, the form fields 205-209, 211, and 213-215 may be part of a single form. As stated, the account number may be a primary account number of the contactless card 101 or a virtual account number. The user may then select the next button 216 to proceed with account generation.

Figure 2G:
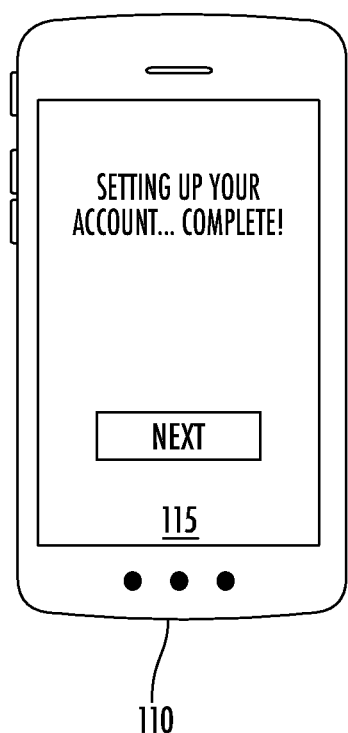

FIG. 2G is as schematic 260 illustrating an embodiment where the user selects the next button 216 of FIG. 2F to complete the account setup using the third-party application 115. As shown, the third-party application 115 indicates that the account has been successfully created. The user may then use the third-party application 115 to make purchases, process payments, etc. using the contactless card 101 (and/or the virtual number generated for the contactless card 101).

Figure 3A:
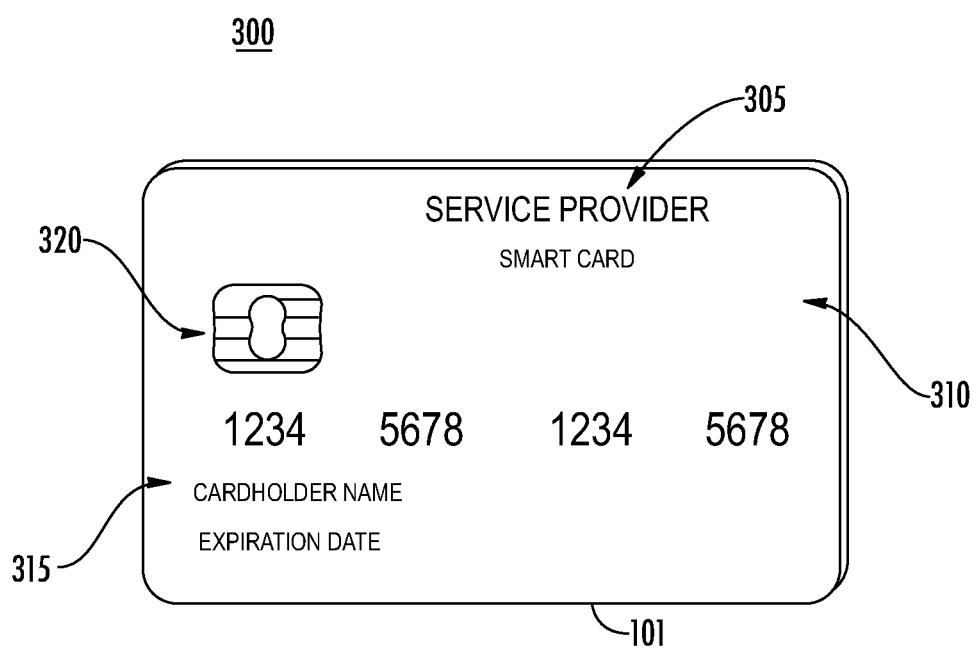
FIGS. 3A-3B illustrate an example contactless card.

FIG. 3A illustrates a contactless card 101, which may comprise a payment card, such as a credit card, debit card, and/or a gift card. As shown, the contactless card 101 may be issued by a service provider 305 displayed on the front or back of the card 101. In some examples, the contactless card 101 is not related to a payment card, and may comprise, without limitation, an identification card. In some examples, the payment card may comprise a dual interface contactless payment card. The contactless card 101 may comprise a substrate 310, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 101 may have physical characteristics compliant with the ID-1 format of the ISO/IEC 7810 standard, and the contactless card may otherwise be compliant with the ISO/IEC 14443 standard. However, it is understood that the contactless card 101 according to the present disclosure may have different characteristics, and the present disclosure does not require a contactless card to be implemented in a payment card.

The contactless card 101 may also include identification information 315 displayed on the front and/or back of the card, and a contact pad 320. The contact pad 320 may be configured to establish contact with another communication device, such as the mobile devices 30, a user device, smart phone, laptop, desktop, or tablet computer. The contactless card 101 may also include processing circuitry, antenna and other components not shown in FIG. 3A. These components may be located behind the contact pad 320 or elsewhere on the substrate 310. The contactless card 101 may also include a magnetic strip or tape, which may be located on the back of the card (not shown in FIG. 3A).

Figure 3B:
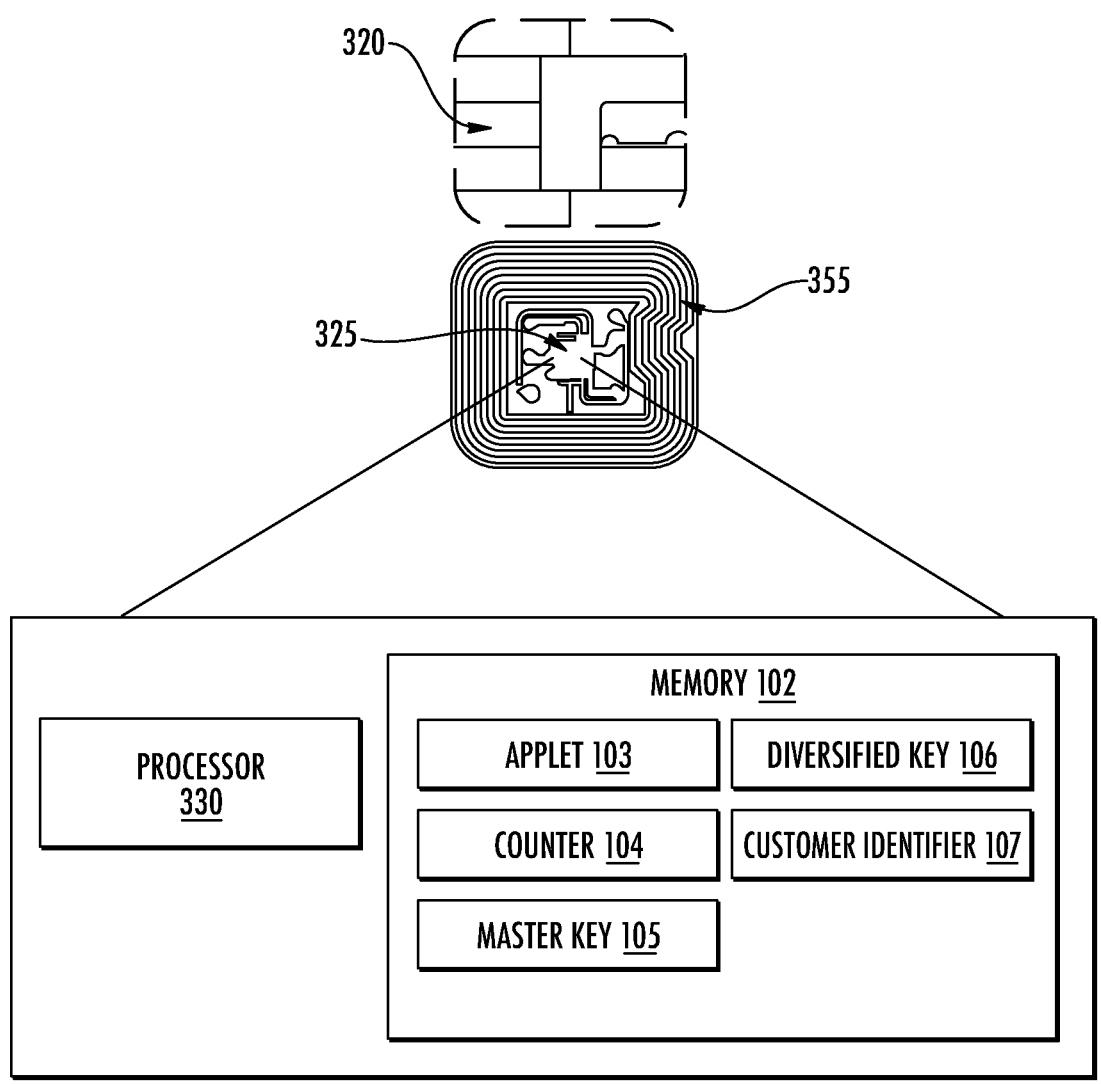

As illustrated in FIG. 3B, the contact pad 320 of contactless card 101 may include processing circuitry 325 for storing and processing information, including a microprocessor 330 and the memory 102. It is understood that the processing circuitry 325 may contain additional components, including processors, memories, error and parity/CRC checkers, data encoders, anti-collision algorithms, controllers, command decoders, security primitives and tamper proofing hardware, as necessary to perform the functions described herein.

The memory 102 may be a read-only memory, write-once read-multiple memory or read/write memory, e.g., RAM, ROM, and EEPROM, and the contactless card 101 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory.

The memory 102 may be configured to store one or more applets 103, the counter 104, master key 105, the diversified key 106, and one or more customer (or user) IDs 107. The one or more applets 103 may comprise one or more software applications configured to execute on one or more contactless cards, such as a Java® Card applet. However, it is understood that applets 103 are not limited to Java Card applets, and instead may be any software application operable on contactless cards or other devices having limited memory. The customer ID 107 may comprise a unique alphanumeric identifier assigned to a user of the contactless card 101, and the identifier may distinguish the user of the contactless card from other contactless card users. In some examples, the customer ID 107 may identify both a customer and an account assigned to that customer and may further identify the contactless card 101 associated with the customer's account. In some embodiments, the applet 103 may use the customer ID 107 as input to a cryptographic algorithm with the keys 105 and/or 106 to generate the encrypted customer ID 109.

The processor and memory elements of the foregoing exemplary embodiments are described with reference to the contact pad, but the present disclosure is not limited thereto. It is understood that these elements may be implemented outside of the pad 320 or entirely separate from it, or as further elements in addition to processor 330 and memory 102 elements located within the contact pad 320.

In some examples, the contactless card 101 may comprise one or more antennas 355. The one or more antennas 355 may be placed within the contactless card 101 and around the processing circuitry 325 of the contact pad 320. For example, the one or more antennas 355 may be integral with the processing circuitry 325 and the one or more antennas 355 may be used with an external booster coil. As another example, the one or more antennas 355 may be external to the contact pad 320 and the processing circuitry 325.

In an embodiment, the coil of contactless card 101 may act as the secondary of an air core transformer. The terminal may communicate with the contactless card 101 by cutting power or amplitude modulation. The contactless card 101 may infer the data transmitted from the terminal using the gaps in the contactless card's power connection, which may be functionally maintained through one or more capacitors. The contactless card 101 may communicate back by switching a load on the contactless card's coil or load modulation. Load modulation may be detected in the terminal's coil through interference. More generally, using the antennas 355, processing circuitry 325, and/or the memory 102, the contactless card 101 provides a communications interface to communicate via NFC, Bluetooth, and/or Wi-Fi communications.

As explained above, contactless cards 101 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader (e.g., the card reader 118 of the device 110), and produce an NDEF message that comprises a cryptographically secure OTP encoded as an NDEF text tag.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. In addition, the given logic flow may be implemented by a hardware element, a software element executed by a processor, or any combination thereof. The embodiments are not limited in this context.

Figure 4:
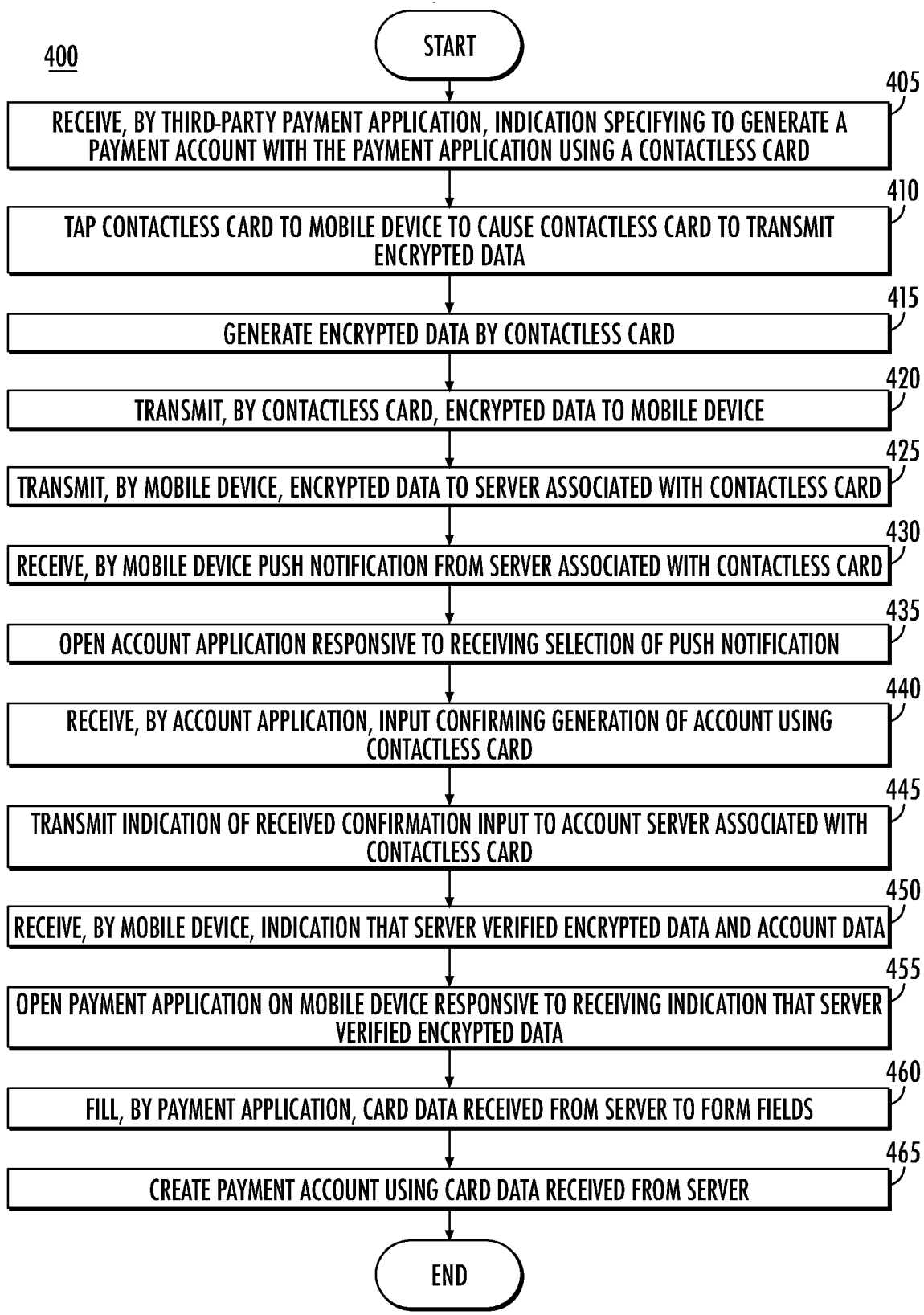
FIG. 4 illustrates an embodiment of a first logic flow.

FIG. 4 illustrates an embodiment of a logic flow 400. The logic flow 400 may be representative of some or all of the operations executed by one or more embodiments described herein. For example, the logic flow 400 may include some or all of the operations to securely generate an account with the third-party application 115 using a contactless card 101. Embodiments are not limited in this context.

As shown, the logic flow 400 begins at block 405, where the third-party application 115 receives an indication specifying to create a payment account using the contactless card 101. For example, a user may select the GUI element 201 of FIG. 2A specifying to generate an account with the third-party application 115 using the contactless card 101. At block 410, the user may tap the contactless card 101 to the device 110 to cause the contactless card 101 to generate and transmit encrypted data (e.g., the encrypted customer ID 109). The user may tap the contactless card 101 responsive to a notification outputted by the third-party application 115 specifying to tap the contactless card 101 to the device 110. At block 415, the applet 103 may generate the encrypted customer ID 109. The applet 103 may transmit the encrypted customer ID 109 to the mobile device 110 at block 420.

At block 425, the mobile device 110 (e.g., the OS 112 and/or the third-party application 115) may transmit the encrypted customer ID 109 to the management application 123 of the server 120. The third-party application 115 may further transmit an indication specifying that the encrypted customer ID 109 is part of an attempt to generate an account with the third-party application 115. At block 430, the mobile device 110 may receive a push notification from the management application 123. As stated, in some embodiments, the management application 123 may decrypt the encrypted customer ID 109 prior to transmitting the push notification to the mobile device 110. At block 435, the account application 113 is opened responsive to the user selecting the push notification. As stated, in some embodiments, the user may provide credentials to access their account via the account application 113. The account application 113 may then request input confirming whether the attempted account generation via the third-party application 115 is valid.

At block 440, the third-party application 115 may receive input specifying that the attempted account generation is valid. For example, the user may select the GUI element 204 of FIG. 2D. At block 445, the third-party application 115 may transmit an indication of the confirmation to the management application 123. At block 450, the OS 112, account application 113, and/or third-party application 115 may receive an indication from the management application 123 specifying that the encrypted customer ID 109 was verified and the account generation is approved. As stated, the management application 123 may decrypt the encrypted customer ID 109 responsive to the initial receipt of the encrypted customer ID 109 (e.g., at block 425) and/or at a different time. For example, the management application 123 may decrypt the encrypted customer ID 109 responsive to receiving the confirmation at block 450. Furthermore, the verification may include account data 154 for the user account associated with the contactless card 101.

At block 455, the third-party application 115 is opened (if not already presented on a display of the mobile device 110). At block 460, the third-party application 115 fills a plurality of form fields with the account data 154 received from the management application 123. The user may optionally edit the information automatically filled into the form fields by the third-party application 115. At block 465, the third-party application 115 creates an account for the user using the account data 154 received from the management application 123. For example, the third-party application 115 may cause a record for the new account to be created in the account data 144 of the third-party server 140.

Figure 5:
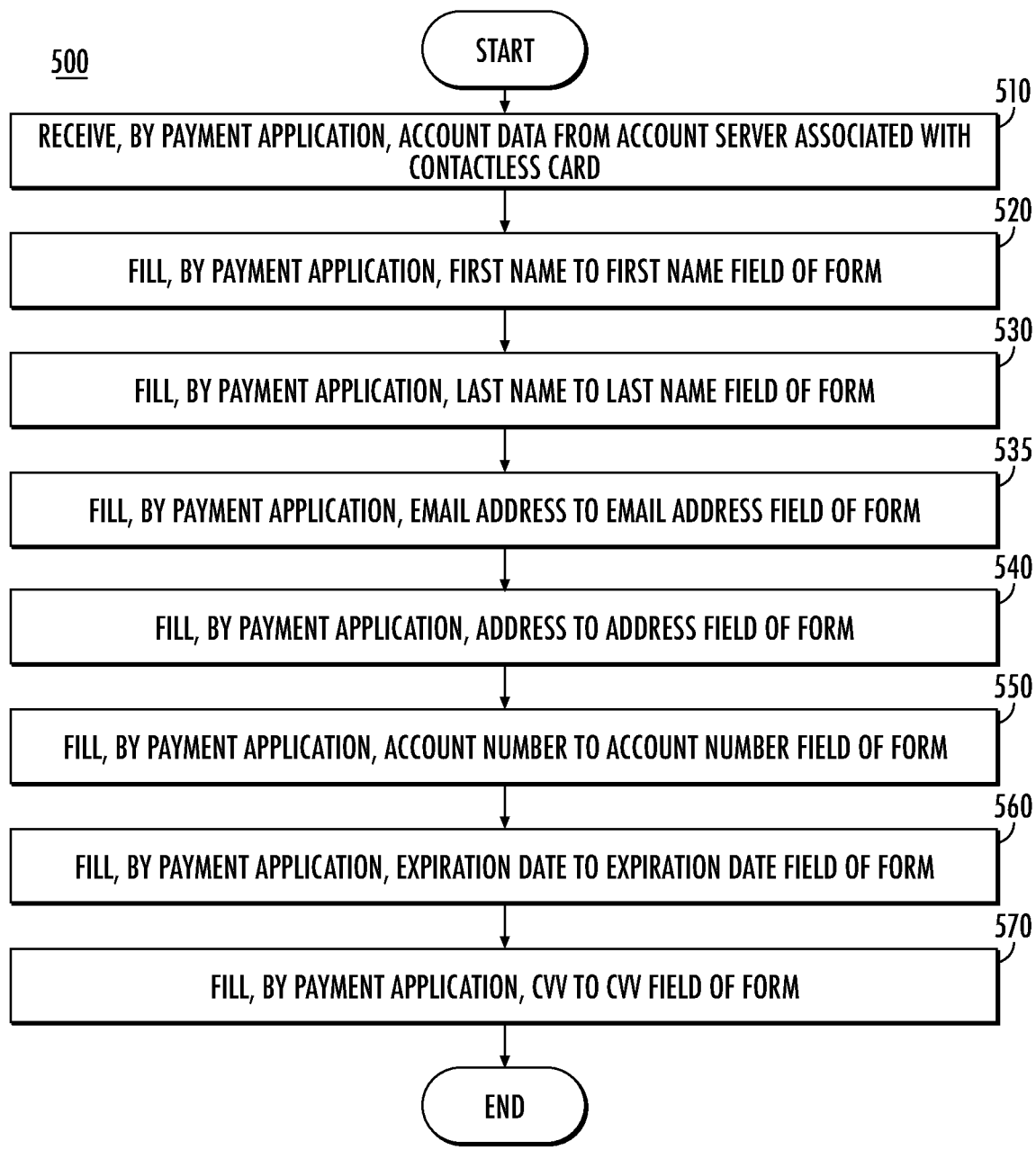
FIG. 5 illustrates an embodiment of a second logic flow.

FIG. 5 illustrates an embodiment of a logic flow 500. The logic flow 500 may be representative of some or all of the operations executed by one or more embodiments described herein. For example, the logic flow 500 may include some or all of the operations to securely autofill data associated with a contactless card 101 to a form. Embodiments are not limited in this context.

As shown, the logic flow 500 begins at block 510, where the third-party application 115 receives the account data 154 from the management application 123. At block 520, the third-party application 115 fills the first name received in the account data 154 to a first name field of the form. At block 530, the third-party application 115 fills a last name in the received account data 154 to a last name field of the form. At block 535, the third-party application 115 fills an email address in the received account data 154 to an email address field of the form. At block 540, the third-party application 115 fills an address in the received account data 154 to an address field of the form.

At block 550, the third-party application 115 fills an account number in the received account data 154 to an account number field of the form. The account number may be the account number of the contactless card 101 and/or a virtual account number generated by the server 120. At block 560, the third-party application 115 fills an expiration date in the received account data 154 to an expiration date field of the form. The expiration date may be of the contactless card 101 and/or the virtual account number. At block 570, the third-party application 115 fills a CVV in the received account data 154 to a CVV field of the form. The CVV may be of the contactless card 101 and/or the virtual account number.

In some examples, the present disclosure refers to a tap of the contactless card. However, it is understood that the present disclosure is not limited to a tap, and that the present disclosure includes other gestures (e.g., a wave or other movement of the card).

Figure 6:
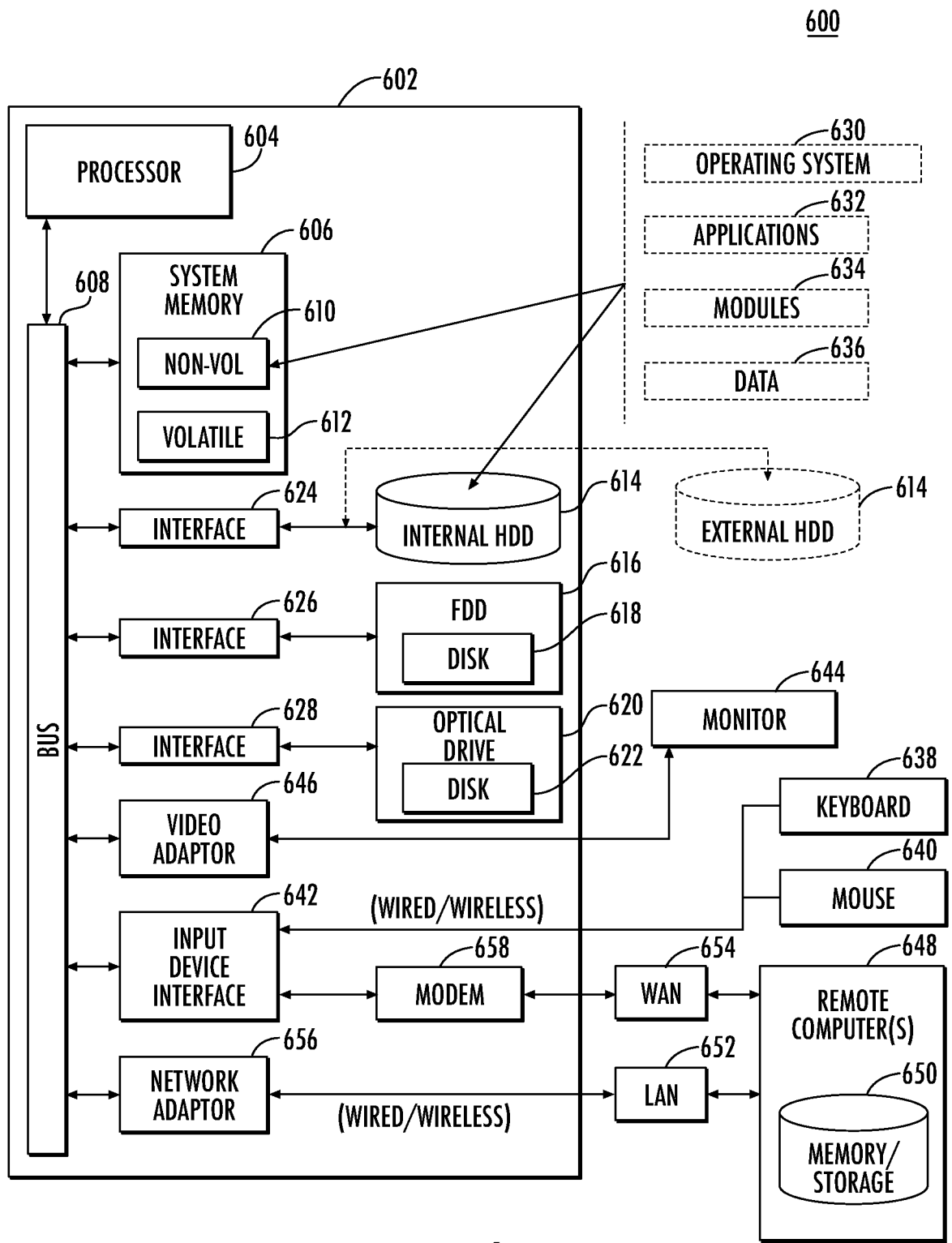
FIG. 6 illustrates an embodiment of a computing architecture.

FIG. 6 illustrates an embodiment of an exemplary computing architecture 600 comprising a computing system 602 that may be suitable for implementing various embodiments as previously described. In various embodiments, the computing architecture 600 may comprise or be implemented as part of an electronic device. In some embodiments, the computing architecture 600 may be representative, for example, of a system that implements one or more components of the system 100. In some embodiments, computing system 602 may be representative, for example, of the mobile devices 110 and server 120 of the system 100. The embodiments are not limited in this context. More generally, the computing architecture 600 is configured to implement all logic, applications, systems, methods, apparatuses, and functionality described herein with reference to FIGS. 1-5.

As used in this application, the terms "system" and "component" and "module" are intended to refer to a computer-related entity, either hardware, a combination of hardware and software, software, or software in execution, examples of which are provided by the exemplary computing architecture 600. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 602 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 602.

As shown in FIG. 6, the computing system 602 comprises a processor 604, a system memory 606 and a system bus 608. The processor 604 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi-processor architectures may also be employed as the processor 604.

The system bus 608 provides an interface for system components including, but not limited to, the system memory 606 to the processor 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computing system 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies. The computing system 602 is generally is configured to implement all logic, systems, methods, apparatuses, and functionality described herein with reference to FIGS. 1-5.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and/or components of the system 100, e.g., the operating system 112, account application 113, third-party applications 115, third-party server 140, account data 124, account data 144, and the management application 123.

A user can enter commands and information into the computing system 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. The monitor 644 may be internal or external to the computing system 602. In addition to the monitor 644, a computer typically includes other peripheral output devices, such as speakers, printers, and so forth.

The computing system 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all of the elements described relative to the computing system 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet. In embodiments, the network 130 of FIG. 1 is one or more of the LAN 652 and the WAN 654.

When used in a LAN networking environment, the computing system 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computing system 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computing system 602, or portions thereof, can be stored in the remote memory/storage device 650. It will be appreciated that the network connections shown are exemplary and other means of establishing a communications link between the computers can be used.

The computing system 602 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method, comprising:
   receiving, by a processor of a device, an indication specifying to generate a payment account, wherein the indication is received by a payment application executing on the processor and the payment account is to be generated with the payment application using a contactless card;
   receiving, by the processor, encrypted data from the contactless card, the encrypted data based on a diversified key generated by the contactless card, the diversified key based on a counter value maintained by the contactless card and a master key associated with the contactless card;
   transmitting, by the processor, the encrypted data to a server associated with an issuer of the contactless card;
   receiving, by the processor, an indication from the server specifying that the server verified the encrypted data based at least in part on decrypting the encrypted data based on a diversified key generated by the server;
   opening, by the processor based on the indication received from the server, a second software application different from the payment application, the second software application being an account application associated with the issuer of the contactless card;
   receiving, by the account application, confirmation input specifying to generate the payment account with the payment application using the contactless card;
   transmitting, by the account application, an indication of the confirmation input to the server associated with the issuer of the contactless card;
   opening, by the processor, the payment application responsive to receiving the confirmation input; and
   generating the payment account using account data, wherein the payment account is generated by the payment application, and wherein at least a portion of the account data is generated by the server.

2. The method of claim 1, wherein the account data is associated with an account associated with the contactless card, the method further comprising:
   receiving, by the payment application, the account data from the server.

3. The method of claim 2, wherein the account data associated with the account comprises: (i) a first name, (ii) a last name, (iii) an email address, (iv) an address, (v) an account number generated by the server, (vi) an expiration date generated by the server for the account number, and (vii) a card verification value (CVV) generated by the server for the account number.

4. The method of claim 3, further comprising:
   filling, by the payment application, the first name in a first name form field of a plurality of form fields of a form in the payment application;
   filling, by the payment application, the last name in a last name form field of the plurality of form fields;
   filling, by the payment application, the email address in an email address form field of the plurality of form fields;
   filling, by the payment application, the address in an address form field of the plurality of form fields;
   filling, by the payment application, the account number in an account number form field of the plurality of form fields;
   filling, by the payment application, the expiration date in an expiration date form field of the plurality of form fields;
   filling, by the payment application, the CVV in a CVV form field of the plurality of form fields; and receiving, by the payment application, input specifying to submit the form to generate the payment account.

5. The method of claim 1, wherein the indication of the confirmation input is transmitted via a hypertext transfer protocol secure (HTTPS) application programming interface (API) call to an API of the server associated with the issuer of the contactless card, wherein the diversified key generated by the server is based on a counter value maintained by the server and a master key maintained by the server, wherein the counter value associated with the contactless card is synchronized with the master key maintained by the server.

6. The method of claim 1, further comprising:
receiving a push notification specifying to provide the confirmation input; and
receiving input selecting the push notification, wherein the account application is opened based on the input selecting the push notification.

7. The method of claim 1, wherein the portion of the account data generated by the server comprises a virtual account number, an expiration date of the virtual account number, and a card verification value (CVV) of the virtual account number, the method further comprising:
displaying, by the payment application, the virtual account number in an account number form field of a plurality of form fields of a form in the payment application;
displaying, by the payment application, the expiration date in an expiration date form field of the plurality of form fields of the form;
displaying, by the payment application, the CVV in a CVV form field of the plurality of form fields of the form; and
receiving, by the payment application, input specifying to submit the form to generate the payment account.

8. A non-transitory computer-readable storage medium, the computer-readable storage medium including instructions that when executed by a processor, cause the processor to:
receive an indication specifying to generate a payment account, wherein the indication is received by a payment application executing on the processor and the payment account is to be generated with the payment application using a contactless card;
receive encrypted data from the contactless card, the encrypted data based on a diversified key generated by the contactless card, the diversified key based on a counter value maintained by the contactless card and a master key associated with the contactless card;
transmit the encrypted data to a server associated with an issuer of the contactless card;
receive an indication from the server specifying that the server verified the encrypted data based at least in part on decrypting the encrypted data based on a diversified key generated by the server;
open based on the indication received from the server, a second software application different from the payment application, the second software application being an account application associated with the issuer of the contactless card;
receive, by the account application, confirmation input specifying to generate the payment account with the payment application using the contactless card;
transmit, by the account application, an indication of the confirmation input to the server associated with the issuer of the contactless card;
open the payment application responsive to receiving the confirmation input; and
generate the payment account using account data, wherein the payment account is generated by the payment application, and wherein at least a portion of the account data is generated by the server.

9. The computer-readable storage medium of claim 8, wherein the account data is associated with an account associated with the contactless card, wherein the instructions further cause the processor to:
receive, by the payment application, the account data from the server associated with the issuer of the contactless card.

10. The computer-readable storage medium of claim 9, wherein the account data associated with the account comprises: (i) a first name, (ii) a last name, (iii) an email address, (iv) an address, (v) an account number generated by the server, (vi) an expiration date generated by the server for the account number, and (vii) a card verification value (CVV) generated by the server for the account number.

11. The computer-readable storage medium of claim 10, wherein the instructions further cause the processor to:
fill, by the payment application, the first name in a first name form field of a plurality of form fields of a form in the payment application;
fill, by the payment application, the last name in a last name form field of the plurality of form fields;
fill, by the payment application, the email address in an email address form field of the plurality of form fields;
fill, by the payment application, the address in an address form field of the plurality of form fields;
fill, by the payment application, the account number in an account number form field of the plurality of form fields;
fill, by the payment application, the expiration date in an expiration date form field of the plurality of form fields;
fill, by the payment application, the CVV in a CVV form field of the plurality of form fields; and
receive, by the payment application, input specifying to submit the form to generate the payment account.

12. The computer-readable storage medium of claim 8, wherein the indication of the confirmation input is transmitted via a hypertext transfer protocol secure (HTTPS) application program interface (API) call to an API of the server associated with the issuer of the contactless card.

13. The computer-readable storage medium of claim 8, wherein the instructions further cause the processor to:
receive a push notification specifying to provide the confirmation input; and
receive input selecting the push notification, wherein the account application is opened based on the input selecting the push notification.

14. The computer-readable storage medium of claim 8, wherein the account data generated by the server comprises a virtual account number, an expiration date of the virtual account number, and a card verification value (CVV) of the virtual account number, wherein the instructions further cause the processor to:
display, by the payment application, the virtual account number in an account number form field of a plurality of form fields of a form in the payment application;
display, by the payment application, the expiration date in an expiration date form field of the plurality of form fields of the form;
display, by the payment application, the CVV in a CVV form field of the plurality of form fields of the form; and
receive, by the payment application, input specifying to submit the form to generate the payment account.

15. A computing apparatus comprising:

a processor; and a memory storing instructions that, when executed by the processor, cause the processor to:

receive an indication specifying to generate a payment account, wherein the indication is received by a payment application executing on the processor and the payment account is to be generated with the payment application using a contactless card;

receive encrypted data from the contactless card, the encrypted data based on a diversified key generated by the contactless card, the diversified key based on a counter value maintained by the contactless card and a master key associated with the contactless card;

transmit the encrypted data to a server associated with an issuer of the contactless card;

receive an indication from the server specifying that the server verified the encrypted data based at least in part on decrypting the encrypted data based on a diversified key generated by the server;

open based on the indication received from the server, a second software application different from the payment application, the second software application being an account application associated with the issuer of the contactless card;

receive, by the account application, confirmation input specifying to generate the payment account with the payment application using the contactless card;

transmit, by the account application, an indication of the confirmation input to the server associated with the issuer of the contactless card;

open the payment application responsive to receiving the confirmation input; and generate the payment account using account data, wherein at least a portion of the account data is generated by the server.

16. The computing apparatus of claim 15, wherein the account data is associated with an account associated with the contactless card.

17. The computing apparatus of claim 16, wherein the account data associated with the account comprises: (i) a first name, (ii) a last name, (iii) an email address, (iv) an address, (v) an account number generated by the server, (vi) an expiration date generated by the server for the account number, and (vii) a card verification value (CVV) generated by the server for the account number.

18. The computing apparatus of claim 17, wherein the instructions further cause the processor to:

fill, by the payment application, the first name in a first name form field of a plurality of form fields of a form in the payment application;

fill, by the payment application, the last name in a last name form field of the plurality of form fields;

fill, by the payment application, the email address in an email address form field of the plurality of form fields;

fill, by the payment application, the address in an address form field of the plurality of form fields;

fill, by the payment application, the account number in an account number form field of the plurality of form fields;

fill, by the payment application, the expiration date in an expiration date form field of the plurality of form fields;

fill, by the payment application, the CVV in a CVV form field of the plurality of form fields; and receive, by the payment application, input specifying to submit the form to generate the payment account.

19. The computing apparatus of claim 15, wherein the indication of the confirmation input is transmitted via a hypertext transfer protocol secure (HTTPS) application program interface (API) call to an API of the server associated with the issuer of the contactless card, wherein the instructions further cause the processor to:

receive, by the payment application, the account data from the server associated with the issuer of the contactless card.

20. The computing apparatus of claim 15, wherein the instructions further cause the processor to:

receive a push notification specifying to provide the confirmation input; and receive input selecting the push notification, wherein the account application is opened based on the input selecting the push notification.

* * * * *